July 30, 1963 — M. V. PARSHALL — 3,099,499
ANTI-SKID DEVICE
Filed Nov. 18, 1960 — 4 Sheets-Sheet 1

INVENTOR.
MILLIS V. PARSHALL
BY
His ATTORNEY

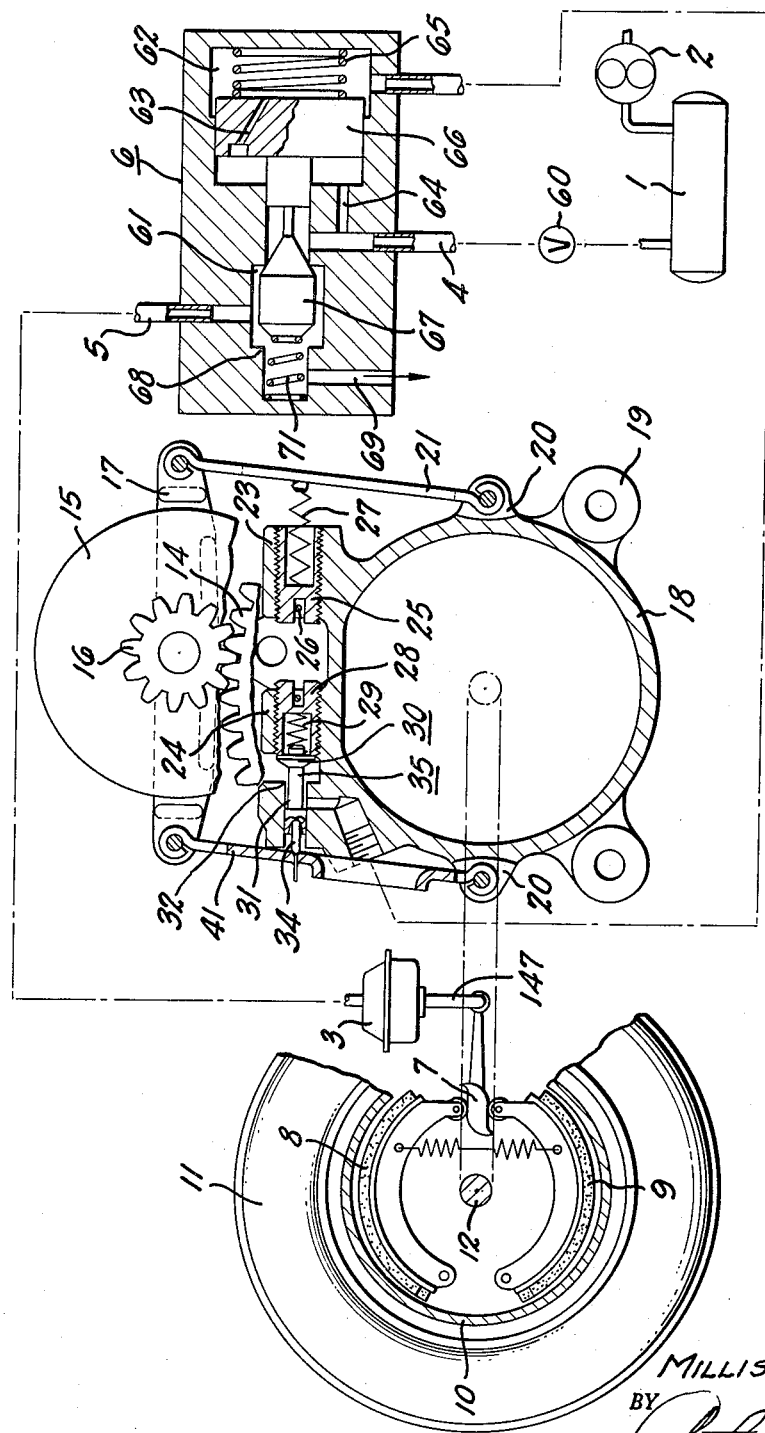

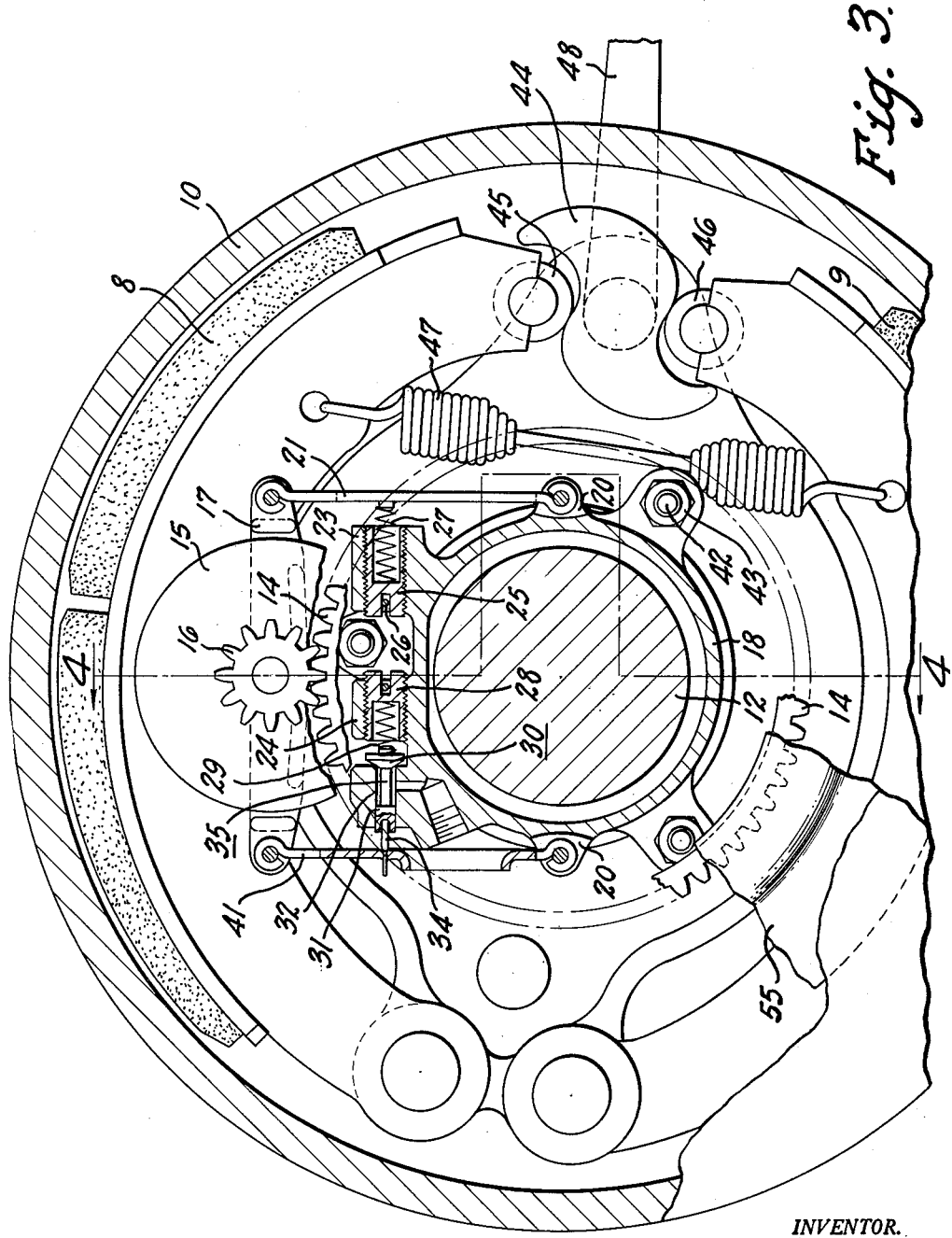

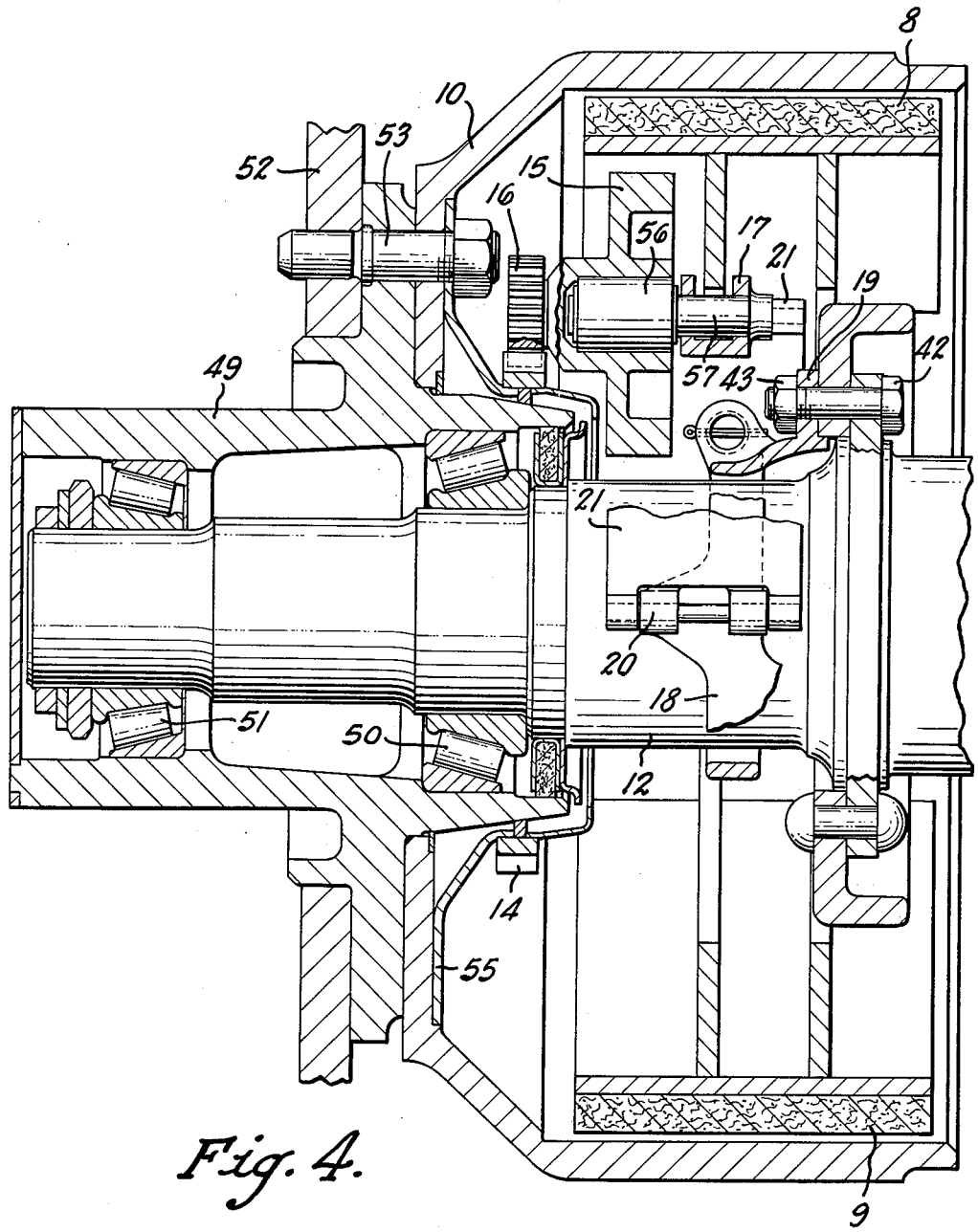

United States Patent Office 3,099,499
Patented July 30, 1963

3,099,499
ANTI-SKID DEVICE
Millis V. Parshall, Pontiac, Mich., assignor to General Motors Corporation, Detroit, Mich., a corporation of Delaware
Filed Nov. 18, 1960, Ser. No. 70,310
8 Claims. (Cl. 303—21)

This invention relates to a vehicle brake and more particularly to a means for preventing skidding of a vehicle in combination with a vehicle brake.

It is a known fact that a skidding vehicle wheel creates a smaller retarding force on the motor vehicle than a vehicle wheel on which the tire is gripping the road surface. The retarding force on the motor vehicle is greatest when the vehicle tire is under a "creep" condition. Under these conditions the tire firmly grips the road although a slight movement between the road surface and the vehicle tire is present. This is an optimum tire condition for braking of a motor vehicle.

It is impossible to maintain this condition of braking through manual control. The instant slipping of the vehicle wheel is present the vehicle brakes must be released and the wheel again allowed to rotate. A human being cannot sense the slipping condition on the vehicle wheel and react sufficiently quickly to provide an ideal braking situation.

Accordingly this invention is intended to prevent a skidding condition whereby the slipping of the vehicle wheel is sensed and counteracted and normal rotation of the vehicle wheel with normal contact with the road surface is again restored.

It is an object of this invention to provide a means for counteracting slipping of a vehicle wheel on the road surface during the braking cycle.

It is an other object of this invention to employ an anti-skid device having a rotor spinning on an axis normal to the direction of motion of the motor vehicle.

It is a further object of this invention to employ an anti-skid device wherein the axis of a rotor is normal to the direction of motion of the motor vehicle and its moment of inertia has a direct relationship to the decelerating force created by normal rotation of the vehicle wheel. Any change in the normal relationship of the rotational deceleration relative to the linear deceleration creates a shifting of the rotor axis to control the braking effort on the associated vehicle wheel.

The objects of this invention are accomplished by employing a rotor spinning on an axis normal to the direction of rotation of a motor vehicle. The rotation of the rotor is controlled by the rotation of the vehicle wheel associated with the corresponding vehicle brake. The deceleration of the rotor is in direct proportion to the linear deceleration of the motor vehicle when the vehicle wheel is rotating normally on the road surface. When the relationship of the rotational deceleration to the linear deceleration of the rotor is changed during the braking cycle the rotor shifts its relative position with respect to the motor vehicle thereby causing a valve means to control the flow of fluid to the vehicle brake associated with the corresponding slipping wheel. In this manner the flow of pressurized fluid to the corresponding vehicle brake is controlled to permit restoration of the rotation of the vehicle wheel and actuation of the associated vehicle wheel brake subsequent to normal rotation on the vehicle wheel.

Further objects and advantages of the present invention will be apparent from the following description, reference being had to the accompanying drawings wherein preferred embodiments of the present invention are clearly shown.

In the drawings:

FIGURE 2 is a schematic diagram of the anti-skid device in combination with the vehicle brakes wherein pressurized fluid from the air chamber is exhausted to the atmosphere and the vehicle brakes are in their retracted position.

FIGURE 3 is a cross section view of the vehicle drum brake with the anti-skid device mounted on the shaft housing.

FIGURE 4 is a cross section view of the anti-skid device and the vehicle brake taken on line 4—4 of FIGURE 3.

Figure 1:
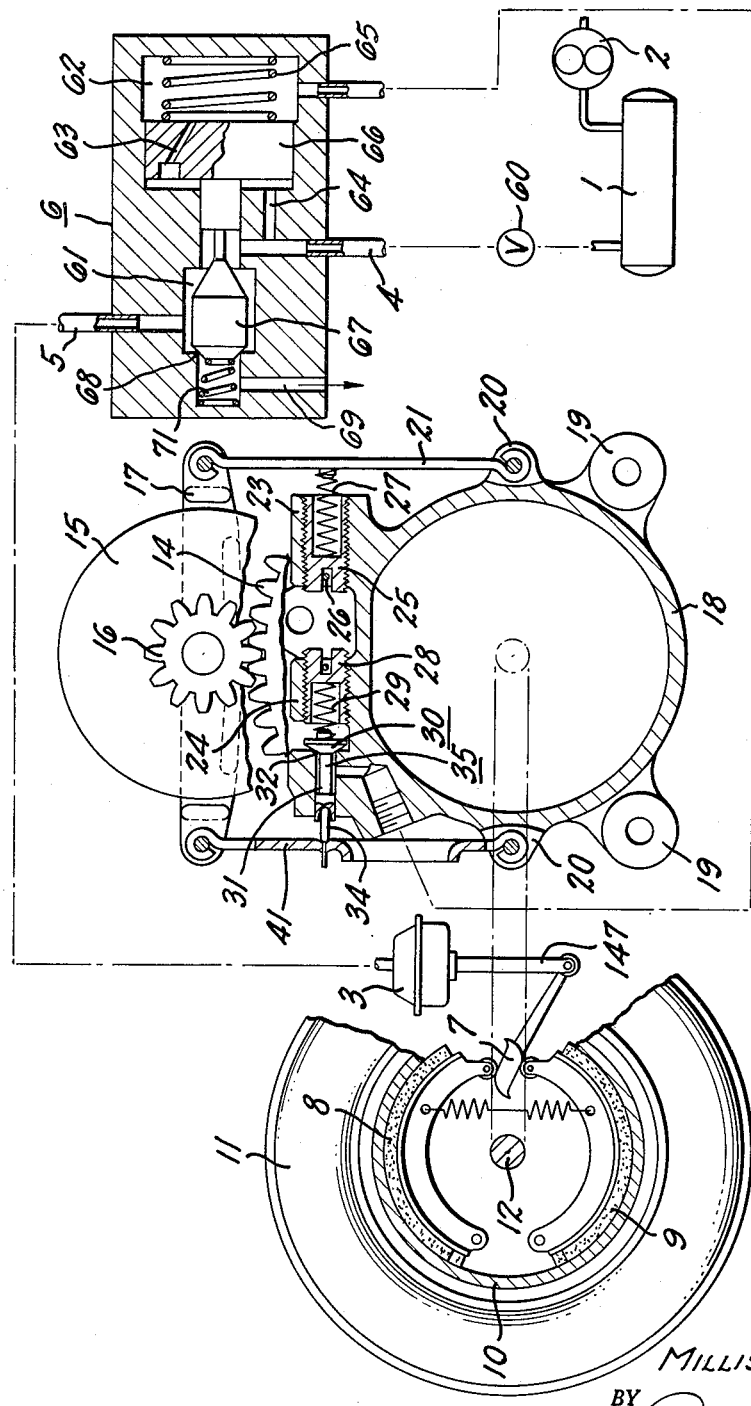
FIGURE 1 is a schematic diagram of the anti-skid device wherein the control valves are in the closed position and the vehicle brakes are actuated.

Referring to FIGURE 1 the anti-skid device is shown in combination with the schematic diagram of the braking system. The air supply 1 is maintained by a pump 2. The air supply is in communication with the air chamber 3 through the conduit 4 and conduit 5 and the secondary poppet valve 6.

The air chamber 3 operates a cam 7 engaging the brake shoes 8 and 9 operating against the brake drum 10. The brake drum 10 rotates as a unit with the wheel 11. The wheel 11 rotates on the shaft 12.

The wheel 11 is also connected to a ring gear 14. The ring gear 14 drives the anti-skid mechanism which includes a rotor 15. The rotor 15 is driven by a pinion 16 which meshes with the ring gear 14. The rotor 15 is rotatably supported by a yoke 17 which is pivotally connected to the stationary member 18 by links 41 and 21. Yoke 17 and stationary member 18 thus form links which cooperate with links 41 and 21 to provide a parallelogram linkage. A suitable stationary member may be located in any place in the automobile by empolying a suitable drive transmission means, however, the stationary member illustrated is designed to be located on the shaft housing by means of a plurality of bosses 19 which are adapted for fastening to the shaft housing. The stationary member 18 is also formed with the lugs 20 for supporting the links 21 and 41. The links 21 and 41 are pivotally connected to the lugs 20 on these lower ends and are also pivotally connected to the yoke 17 on their upper ends.

The stationary member 18 also has integrally formed embossments 23 and 24 having a threaded cylindrical opening extending through the bosses. The boss 23 receives the threaded thimble 25 which is maintained in its position by the cotter pin 26. The thimble 25 receives the spring 27 which seats with one end on a button formed integral with link 21.

The boss 24 receives a thimble 28 which also forms a spring retainer for the opposing end of the primary poppet valve spring 29 which seats on the poppet valve element 30. The poppet valve element 30 has a cylindrical portion 31 for maintaining concentricity of the poppet valve element with the seat 32. The poppet valve 35 as well as yoke 17 and rotor 15, are biased in the relative position shown by compression spring 29, the bias being adjustable by means of spring 27 and thimble 25. In this position the poppet valve 35 is in a closed position.

FIGURE 2 is a view similar to FIGURE 1 in its disclosure, however, the primary poppet valve and the secondary poppet valve are in the open position to exhaust air to the atmosphere. In this position the brake chamber 3 does not contain pressurized air and therefore the brakes are released. The disclosure includes the same component parts as that illustrated in FIGURE 1.

FIGURE 3 illustrates the anti-skid device mounted on a flange of the stationary member similar to that illustrated in FIGURES 1 and 2. The disclosure illustrates the devices mounted within the braking structure. The device as illustrated with proper adaptations could be used in conjunction with any type of a wheel and shaft assembly. The particular disclosure of FIGURE 3 is intended to function in cooperation with a trailer wheel wherein the shaft does not rotate and the stator member is mounted in a flange of the shaft. The wheel and brake drum are rotatably mounted on the shaft.

The stationary member 18 is bolted to the shaft flange by means of a plurality of bolts 42 and nuts 43. The brake shoes 8 and 9 are pivotally anchored on a stationary element. A cam 44 operates against the rollers 45 and 46 of the brake shoes 8 and 9, respectively. The cam 44 is operated by a push rod 147 rotating an arm 48 connecting to the cam 44. In this manner the brake shoes are expanded against the inner periphery of the brake drum 10 to provide retardation of the rotation of the brake drum. The brake shoes 8 and 9 are retracted by means of the spring 47.

The shaft 12 provides a mounting means for the wheel hub 49 through the plurality of bearing assemblies 50 and 51. The hub 49 provides a mounting for the wheel 52 and the brake drum 10 which are fastened by means of a plurality of bolts 53.

The ring gear 14 is fastened to the bell shaped support 55 which is also fastened to the radial wall of the brake drum 10. The ring gear rotates with the brake drum 10. The ring gear 14 meshes with the pinion 16 to provide a driving means for the rotor 15. The rotor 15 is rotatably mounted on the bearing assembly 56 which is supported on a stub shaft 57 in the yoke 17. The yoke 17, being pivotally supported on the links 21 and 41, constrains the locus of positions of the axis of the rotor in cylinder concentric relationship to the wheel axis under influence of the biasing force of the springs 27 and 29.

The operation of the device will be described in the following paragraphs.

The anti-skid device as illustrated embodies a mechanism capable of sensing a "slipping" condition of the vehicle road wheel and initiating a corrective measure to overcome the slipping of the wheel. The primary and secondary poppet valves should be located sufficiently close to each other and having conduit means connecting each other to eliminate delay in the reaction of the secondary poppet valve subsequent to the primary poppet valve. It is also desirable that the conduit means 5 be sufficiently large to permit quick exhaust of the air chambers 3 through the secondary poppet valve 6.

The rotor 15 and pinion 16 rotate on an axis parallel with the axis of the vehicle wheel. The rotor is supported by the links connected to the yoke providing a rotatable support for the rotor and is yieldably restrained to the position as shown in FIGURES 1 and 3. This position is maintained by the primary poppet valve spring 29 and the spring 27 acting through the links 21 and 41. While so restrained the rotor and pinion are caused to spin at a rate proportional to the rate of rotation of the associated road wheel and, of course, their respective rates of angular acceleration or deceleration are likewise proportional. With this proportion the pinion tooth loadings are proportional to angular decelerations and to the polar moment of inertia of the rotor and pinion assembly.

During linear deceleration of the vehicle a force proportional to such linear deceleration and to the mass of the rotor and pinion and links 41 and 21 is required merely to maintain rotor and pinion axis in position as shown. Such force can act only at the gear tooth mesh.

It is a feature of the subject design that the relationship of the polar moment of inertia of the rotor and pinion assembly about the axis of the rotor and the mass moment of rotor, pinion, and links about the axis of the axle shall be substantially equal to the relationship as between the angular deceleration of the rotor and pinion and the normally simultaneous linear deceleration of the vehicle. Thus, the force required to maintain rotor and pinion in position during such vehicle deceleration is substantially equal in magnitude and the point of application, but opposite in direction, to the force required to simultaneously change the rate of spin of the rotor and pinion at the ratio provided. In case the associated road wheel slips as the result of severe brake application, however, the rotor 15 is subject to angular deceleration which bears no relation to the linear deceleration. As the result the rotor 15, tending to continue spinning at a constant rate, tends to "walk around" the ring gear, exerting a force against the push rod 34 and the poppet valve 30 through the link 41 proportional to "slip deceleration" only. At a prescribed value of "slip deceleration," as determined by the net load of the springs 26 and 29, the poppet valve will be opened, initiating corrective action. The secondary poppet 6 valve operates subsequently to the primary poppet valve 35.

It is assumed that prior to opening of the primary poppet valve the vehicle brakes are actuated through the control valve 60 which is manually controlled permitting pressurized fluid from the air supply 1 to pass through the secondary poppet valve 6 through the conduit means 5 to the air chamber 3. In this manner the vehicle brakes are actuated through the air chamber and operating cam 7 as illustrated in FIGURES 1 and 2. Under brake operating conditions pressurized air is within the valve chamber 61 which receives a secondary poppet valve 67. The secondary valve chamber 61 is in communication with the air compartment 62 through the orifice 63 and passage 64. With an equalization of pressure within the compartment 62 and chamber 61 the spring 65 biases portion 66 to the position as shown in FIGURE 1. In this position the piston 66 contacts the end of the valve element 67 of the poppet valve 6. The valve element 67 is biased to a contacting position on the valve seat 68 thereby closing communication to the exhaust port 69.

With the operation of the primary poppet valve 35, the air compartment 62 is permitted to exhaust through the primary poppet valve 35. With the diminishing of the pressure in the air compartment 62 the piston 66 moves to compress the spring 65 and the spring 71 biases the secondary poppet valve element 67 to an open position permitting the exhaust of air pressure from the air chamber 3 through the secondary poppet valve 6. In this manner the vehicle brakes are released.

Referring to FIGURE 2, the device is illustrated wherein the primary poppet valve 35 is biased to an open position and the secondary poppet valve is also in an open position permitting the exhaust of the air chamber 3. In this position the vehicle brakes are released even though the manual control 60 is in the actuated position. With a decrease in the braking effort on the vehicle wheel 11 the wheel is again permitted to rotate due to the frictional contact with the roadway. With the increased angular rotation of the vehicle wheel, the angular deceleration and the linear deceleration during normal rotation is again restored. This is accomplished when the rotor tends to "walk around" to its normal position thereby closing the primary poppet valve 35. With a closure of the primary poppet valve 35 the pressure again builds up in the air compartment 62 through the orifice 63 due to pressurization of fluid in the passage 64. The increased pressure in the air compartment 62 biases piston 66 to close the secondary poppet valve 6. In this manner the braking effort is again applied on the vehicle brake due to the pressurization of fluid within the air chamber 3. This completes the cycle of the anti-skid device.

As a part of the function of the subject device, it is desirable that the closure of the primary poppet valve shall occur in an appropriate instant of the control cycle. To this end it is proposed that an optimum value of the net "spring constant" of springs 26 and 29 be determined and incorporated in the subject instrument. In view of the many variables encountered in actual service, it is deemed impractical to specify a specific spring rate in this patent application. However, a range of spring ratios appropriate to a specific design of parts should be adapted to a specific vehicle. It is possible that in addition to the proper values assigned to the springs it may be necessary to incorporate some damping means to prevent undesirable overtravel upon closure. These specific refinements are not, however, included in this patent application as it is believed they do not add to the basic idea covered in this patent application.

While the embodiments of the present invention as herein disclosed, constitute preferred forms, it is to be understood that other forms might be adopted.

What is claimed is as follows:

1. Means for counteracting wheel slipping in a vehicle braking system comprising in combination, a vehicle wheel, a vehicle brake having a fluid actuating chamber associated with said vehicle wheel, a source of pressurized fluid, conduit means connecting said source of pressurized fluid with said actuating chamber, manual control mean operating said vehicle brake, a wheel slip control valve in said conduit means, means controlling said slip control valve including said vehicle wheel, a rotor, gear means connected to said vehicle wheel for rotating said rotor, a yoke for rotatably supporting said rotor, pivoting means for pivotally supporting said yoke for translatory arcuate movement about the rotational axis of the vehicle wheel, a stationary member pivotally supporting said pivoting means and rotatably supporting said vehicle wheel, means operatively biasing said yoke to a neutral translatory position, means connecting said control means to said slip control valve operating said control valve means in response to change of angular deceleration relative to linear deceleration thereby controlling the flow of fluid to said fluid actuating chamber in said braking means when said vehicle brakes are actuated.

2. Means for preventing skidding in a vehicle braking system comprising in combination, a vehicle wheel, a fluid brake having a fluid actuating chamber associated with said vehicle wheel, a source of pressurized fluid connected with said fluid actuating chamber of said vehicle brakes, manual means controlling a valve in said conduit means operating said vehicle brake, a skid control valve in said conduit means, means operating said skid control valve including, a stationary member, a yoke member, pivoting means connecting said stationary member to said yoke member for arcuate translatory movement about the wheel rotational axis, means operatively biasing said yoke member to a center translatory position, a rotor rotatably mounted on said yoke member, a gear connected to said vehicle wheel rotating said rotor in direct relation to the speed of said vehicle wheel, means connecting said pivoting means to said skid control valve controlling the flow of pressurized fluid from said source of pressurized fluid to said fluid actuating chamber of said vehicle brakes when the angular deceleration of said vehicle wheel is upset relative to the linear deceleration of said vehicle when said vehicle brakes are actuated.

3. Means for preventing skidding in a vehicle braking system comprising in combination, a vehicle wheel, a vehicle brake associated with said vehicle wheel, a fluid actuating chamber in said vehicle brake, a source of pressurized fluid, conduit means connecting said source of pressurized fluid with said fluid actuating chamber, a skid control valve in said conduit means, an anti-skid mechanism including, a stationary member having said wheel rotatably supported thereon, a rotor support member, parallel vertical pivoting links pivotally mounted on said stationary member and pivotally connected to said rotor support member, means operatively biasing said vertical pivoting links to a vertical position, a rotor rotatably supported on said rotor support member, a gear means connected to said vehicle wheel rotating said rotor at a rate proportional to the speed of said wheel, means connected to said pivoting links controlling the operation of said anti-skid control valve thereby providing a means for regulating the flow of pressurized fluid from said source of pressurized fluid to said fluid actuating chamber of said braking means when said vehicle brakes are actuated.

4. Means for preventing skidding in a vehicle braking system comprising in combination, a vehicle wheel, a vehicle brake associated with said vehicle wheel, a fluid actuating chamber in said vehicle brake, a source of pressurized fluid, conduit means connecting said source of pressurized fluid with said fluid actuating chamber of said vehicle brake, a manually controlled valve in said conduit means controlling the operation of said vehicle brakes, an auxiliary control valve in said conduit means, an anti-skid mechanism including, a stationary member, a horizontally extending yoke, two substantially vertical pivoting links pivotally mounted on said stationary member and pivotally connecting the ends of said yoke, means acting on said vertical pivoting links and said stationary member resiliently biasing said links to a vertical position, a rotor rotatably mounted in said yoke, gear means on said vehicle wheel driving said rotor, means connected to the pivoting links of said anti-skid mechanism and connected to said auxiliary valve to exhaust air from said actuating chamber and control the flow of pressurized fluid from said source of pressurized fluid to said fluid actuating means in response to a change in the angular deceleration of said vehicle wheel relative to the linear deceleration of said vehicle when said vehicle brakes are actuated.

5. Means for preventing skidding in a vehicle braking system comprising in combination, a vehicle wheel, a vehicle brake associated with said vehicle wheel, a fluid actuating chamber in said vehicle brake, a source of pressurized fluid, conduit means connecting said source of pressurized fluid with said fluid actuating chamber of said vehicle brake, a manually controlled valve in said conduit means for controlling the operation of said vehicle brakes, an auxiliary control valve in said conduit means, an anti-skid mechanism including, a stationary member, a horizontally extending yoke member, pivoting link means pivotally mounted on said stationary member and pivotally connected to said yoke member and extending vertically, a rotor rotatably mounted on said yoke member having an axis parallel with the axis of the shaft of said vehicle wheel, means for rotatably driving said rotor from said wheel, resilient means biasing said link means to an intermediate and vertical position, means connected to said link means and said auxiliary control valve to control the flow of pressurized fluid from said source of pressurized fluid to said vehicle brake and from said vehicle brake to exhaust in response to a change in the proportion of angular deceleration to linear deceleration and thereby preventing the skidding of said vehicle wheel when said vehicle brakes are actuated.

6. An anti-skid mechanism for a vehicle wheel subject to linear and angular accelerations and having a brake system for applying and releasing a wheel brake, said mechanism comprising: a non-rotatable mount having the vehicle wheel rotatably mounted thereon and a brake release and apply control, a yoke having a parallelogram-pivoted linkage mounting said yoke on said mount for translatory movement, means operatively biasing said yoke to a neutral translatory position relative to said non-rotatable element, an inertia member rotatably mounted on said yoke and having an axis movable in an arc about the rotatable axis of the vehicle wheel upon pivotal translatory movement of said yoke on said linkage in opposition to said biasing means, means driving said inertia member from said wheel in all arcuate positions thereof relative to the wheel axis and including a drive member on said wheel and a driven member drivingly connected to said inertia member, said inertia member and driven member forming an angular accelerometer having a polar moment of inertia and said inertia member and driven member and yoke and links forming a linear accelerometer having a mass moment about the vehicle wheel axis, the ratio of said moments being substantially equal to the ratio of angular acceleration of said angular accelerometer to the simultaneous linear acceleration of the vehicle wheel to maintain a normally balanced condition, and means connecting said linkage to said brake release and apply control and sensitive to pivotal movement of said linkage for releasing the wheel brake when the vehicle wheel tends to skid and disturb the acceleration ratio.

7. Means for comparing angular acceleration and linear acceleration of a body subject to rotation and linear movement and generating a control signal having one value when said accelerations are in a predetermined ratio and a different value when the acceleration ratio is changed, said means comprising: a non-rotatable linearly movable element having said body rotatably mounted thereon, a control signal mechanism on said element, a parallelogram linkage having pivoting connections with said element forming one link thereof, another link opposite said one link, means operatively biasing said linkage to a neutral translatory position of said another link relative to said one link, an inertia member rotatably mounted on said another link and having a rotational axis arcuately movable about the rotational axis of said body upon pivotal translatory movement of said another link relative to said one link, means for rotatably driving said inertia member from said body in all arcuate positions of said another link relative to the body rotational axis and including a drive member on said body and a driven member driven thereby and drivingly connecting to said inertia member, said inertia member and said driven member constituting an angular accelerometer having a polar moment of inertia and said inertia member and driven member and parallelogram linkage constituting a linear accelerometer having a mass moment about the body rotational axis, the ratio of said moments being substantially equal to the ratio of angular acceleration of said angular accelerometer to the simultaneous linear acceleration of said body to maintain a normally balanced neutral translatory condition, and means connecting said parallelogram linkage to said control signal mechanism to change the output from the one value to the different value when said angular and linear acceleration ratio is changed.

8. Means for sensing a change in angular acceleration relative to linear acceleration of a rotating and linearly moving body, said means comprising: a four-link parallelogram linkage including a first link having said body rotatably mounted thereon and linearly movable therewith, a second link opposite said first link, and third and fourth links pivotally joined to said first and second links, means operatively engaging said first and third and fourth links to bias said second link to a neutral balanced translatory position, an inertia member rotatably mounted on said second link on an axis having arcuate translatory movement with pivotal movement of said second link about the rotational axis of said body on said first link, a driven gear on said body and a driving gear meshing therewith drivingly connecting to rotate said inertia member at a rotational speed directly related to the rotational speed of said body, said inertia member and said driven gear constituting an angular accelerometer having a polar moment of inertia and said inertia member and driven gear and driving gear and second and third and fourth links constituting a linear accelerometer having a mass moment about the body rotational axis, the ratios of said moments being substantially equal to the ratio of angular acceleration of said angular accelerometer to the simultaneous linear acceleration of said body to maintain the normally balanced translatory position of said second link, and means for connecting said parallelogram linkage to a signal output mechanism.

References Cited in the file of this patent

UNITED STATES PATENTS

| | | |
|---|---|---|
| 2,491,666 | Keller | Dec. 20, 1949 |
| 2,874,711 | Anxionnaz | Feb. 24, 1959 |
| 2,920,924 | Reswick et al. | Jan. 12, 1960 |

FOREIGN PATENTS

| | | |
|---|---|---|
| 965,247 | Germany | June 6, 1957 |